US011555276B2

(12) United States Patent
Triclot et al.

(10) Patent No.: US 11,555,276 B2
(45) Date of Patent: Jan. 17, 2023

(54) HEAT SEALABLE BARRIER COATING

(71) Applicant: SUN CHEMICAL CORPORATION, Parsippany, NJ (US)

(72) Inventors: Magali Triclot, Reze (FR); Pierrick Le Lain, Reze (FR); Michel Béché, Nantes (FR); Dominique Caron, Saint Philbert de Bouaine (FR); Jean-Dominique Turgis, Vertou (FR)

(73) Assignee: Sun Chemical Corporation, Parsippany, NJ (US)

( * ) Notice: Subject to any disclaimer, the term of this patent is extended or adjusted under 35 U.S.C. 154(b) by 241 days.

(21) Appl. No.: 16/607,458

(22) PCT Filed: Apr. 26, 2018

(86) PCT No.: PCT/US2018/029528
§ 371 (c)(1),
(2) Date: Oct. 23, 2019

(87) PCT Pub. No.: WO2018/200783
PCT Pub. Date: Nov. 1, 2018

(65) Prior Publication Data
US 2020/0131708 A1    Apr. 30, 2020

Related U.S. Application Data

(60) Provisional application No. 62/491,301, filed on Apr. 28, 2017, provisional application No. 62/510,315, filed on May 24, 2017.

(51) Int. Cl.
| | |
|---|---|
| *D21H 19/20* | (2006.01) |
| *D21H 27/10* | (2006.01) |
| *B65D 65/42* | (2006.01) |
| *D21H 19/18* | (2006.01) |
| *D21H 19/40* | (2006.01) |
| *D21H 19/58* | (2006.01) |
| *D21H 21/16* | (2006.01) |

(52) U.S. Cl.
CPC ............ *D21H 19/20* (2013.01); *D21H 27/10* (2013.01); *B65D 65/42* (2013.01); *D21H 19/18* (2013.01); *D21H 19/40* (2013.01); *D21H 19/58* (2013.01); *D21H 21/16* (2013.01)

(58) Field of Classification Search
CPC ........ B65D 65/42; B65D 5/563; D21H 21/16; D21H 27/10; D21H 19/58; D21H 19/40; D21H 19/18; D21H 19/20; C09D 191/06; C09D 133/08; Y02W 90/10; C08L 23/06
USPC ....................................................... 428/34.2
See application file for complete search history.

(56) References Cited

U.S. PATENT DOCUMENTS

| | | |
|---|---|---|
| 3,592,729 A | 7/1971 | Strickland |
| 4,117,199 A | 9/1978 | Gotoh et al. |
| 4,517,228 A † | 5/1985 | Matejka |
| 5,654,039 A † | 8/1997 | Wenzel |
| 5,763,100 A | 6/1998 | Quick et al. |
| 6,071,617 A | 6/2000 | Wissgott |
| 6,117,563 A | 9/2000 | Watanabe |
| 6,307,192 B1 | 10/2001 | Ulfstedt et al. |
| 7,019,054 B2 | 3/2006 | Dixit et al. |
| 7,282,273 B2 | 10/2007 | Murphy et al. |
| 7,320,825 B2 | 1/2008 | Morabito |
| 7,332,450 B2 † | 2/2008 | Boylan |
| 7,427,444 B2 | 9/2008 | Rabasco et al. |
| 7,737,200 B2 | 6/2010 | Jabar, Jr. et al. |
| 8,440,262 B2 | 5/2013 | Dandenault et al. |
| 8,734,895 B2 | 5/2014 | Propst, Jr. |
| 8,765,852 B1 † | 7/2014 | Swei |
| 8,771,812 B2 | 7/2014 | Seyffer et al. |
| 8,771,835 B2 | 7/2014 | Iyengar et al. |
| 9,840,642 B2 † | 12/2017 | Mongrain |
| 2005/0131103 A1 | 6/2005 | Hassan et al. |
| 2005/0159536 A1 † | 7/2005 | Smith |
| 2006/0014014 A1 † | 1/2006 | Van Den Abbeele |
| 2009/0252980 A1 | 10/2009 | Berg et al. |
| 2010/0136355 A1 | 6/2010 | Van Den Abbeele Henk |
| 2011/0262745 A1 | 10/2011 | Ronka |
| 2013/0004748 A1 | 1/2013 | Heiskanen et al. |
| 2013/0323368 A1 | 12/2013 | Santos |
| 2013/0330526 A1 † | 12/2013 | Song |
| 2015/0111011 A1 | 4/2015 | Hoekstra |
| 2015/0225586 A1 † | 8/2015 | Ingle |
| 2016/0009939 A1 | 1/2016 | Weisbecker |
| 2017/0031254 A1 † | 2/2017 | Vanbesien |
| 2017/0073540 A1 † | 3/2017 | Torrison |
| 2017/0107034 A1 | 4/2017 | Okamoto |
| 2018/0355204 A1 | 12/2018 | Turkki |

FOREIGN PATENT DOCUMENTS

| | | |
|---|---|---|
| CA | 2 323 341 A1 | 4/2001 |
| EP | 2257430 B1 | 3/2009 |
| ES | 2540954 T3 | 5/2012 |
| GB | 1097875 | 1/1968 |
| JP | 1994-200498 | 7/1994 |

(Continued)

OTHER PUBLICATIONS

Colombian Office Action issued in counterpart CO Application No. 201880026979.6 dated Nov. 30, 2021 and English language machine translation thereof.

Japanese Office Action issued in counterpart JP Application No. JP 2019-557395 dated Dec. 14, 2021 with English translation thereof.

(Continued)

*Primary Examiner* — Mark Halpern

(74) *Attorney, Agent, or Firm* — Marian E. Fundytus; Ostrolenk Faber LLP.

(57) ABSTRACT

The present invention provides a heat-sealable water-based coating composition suitable for coating substrates used for packaging of products that contain grease, oil, water, etc. The coating compositions comprise acrylic polymer or copolymer emulsions and melting waxes. The substrates may be formed into containers, such as cups, for example. The coatings provide a barrier that is resistant to the permeation of, for example, grease, oil, water, and other liquids. Furthermore, the coating compositions are compostable.

10 Claims, 1 Drawing Sheet

(56) References Cited

FOREIGN PATENT DOCUMENTS

| | | | |
|---|---|---|---|
| JP | 1995-033137 | | 2/1995 |
| JP | 1995-119080 | | 5/1995 |
| JP | 1996-260385 | | 10/1996 |
| JP | 1998-226987 | | 8/1998 |
| JP | 2003147230 | | 5/2003 |
| JP | 2005 081662 A | | 3/2005 |
| JP | 2011219624 A | † | 11/2011 |
| JP | 2013189430 A | † | 9/2013 |
| JP | 2015-077781 | | 4/2015 |
| RU | 2732270 C2 | | 11/2016 |
| WO | WO2006062523 | | 6/2006 |
| WO | WO 2007/050964 A1 | | 5/2007 |
| WO | WO2010114899 | | 10/2010 |
| WO | WO 2011/110498 A1 | | 9/2011 |
| WO | WO2013075918 | | 5/2013 |
| WO | WO 2014/028203 A1 | | 2/2014 |
| WO | WO 2014/130311 A1 | | 8/2014 |
| WO | WO2015040134 A1 | | 9/2014 |

OTHER PUBLICATIONS

Indian Office Action issued in counterpart IN Application No. 201947043166 dated Dec. 31, 2021 with English translation thereof.
Chilean Office Action issued in counterpart CL Application No. 201902926 dated Dec. 9, 2021 and machine English language translation thereof.
International Search Report issued in International Application No. PCT/US2018/029528, dated Jul. 3, 2018.
Written Opinion of the International Searching Authority issued in International Application No. PCT/US2018/029528, dated Jul. 3, 2018.
International Preliminary Report on Patentability (Chapter II of the Patent Cooperation Treaty) issued in International Application No. PCT/US2018/029528, dated Apr. 29, 2019.
Supplementary European Search Report issued in counterpart EP Application No. EP 18 79 2202, dated Jan. 12, 2021.
Communication pursuant to Rule 114(2) EPC issued in counterpart EP Application No. EP 18 79 2202, dated Oct. 13, 2020.
Chilean Office Action issued in counterpart CL Application No. 201902926 dated Jan. 15, 2021 and English language summary thereof.
Chilean Office Action issued in counterpart CL Application No. 201902926 dated Jun. 17, 2021 and English language summary thereof.
Chinese Office Action issued in counterpart CN Application No. 201880026979.6 dated Jul. 26, 2021 and English language summary thereof.
Colombian Office Action issued in counterpart CO Application No. 201880026979.6 dated Jul. 26, 2021 and English language summary thereof.
Philippines Office Action issued in counterpart PH Application No. Jan. 2019/502391 dated Aug. 10, 2021.
Chinese Office Action issued in counterpart CN Application No. 201880026979.6 dated Feb. 15, 2022 and English language machine translation thereof.
Columbia Office Action issued in counterpart Columbian application No. NC2019/0012007, dated Oct. 31, 2022 with machine English language translation thereof.
Basf, "Functional Packaging Coatings Joncryl® Selection Guide," 5 pages, 2009.†
Hideo Gotoh, U.S. Pat. No. 4,117,199, "Process for producing moisture and water-proof paper," Sep. 26, 1978.†

† cited by third party

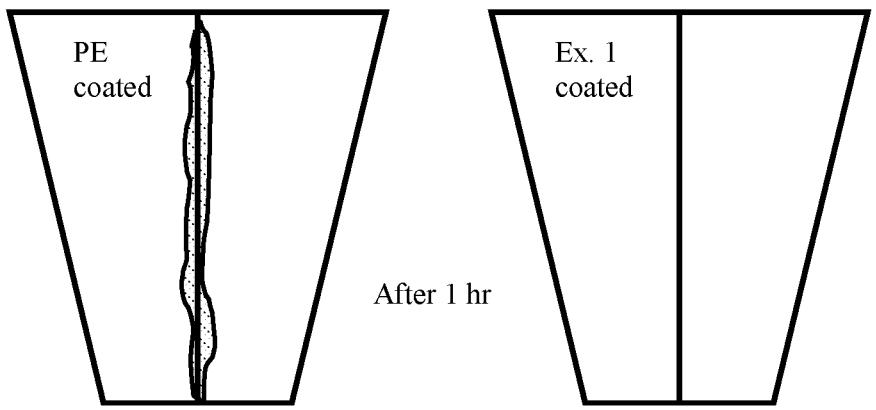
Figure 1(a)  After 1 hr
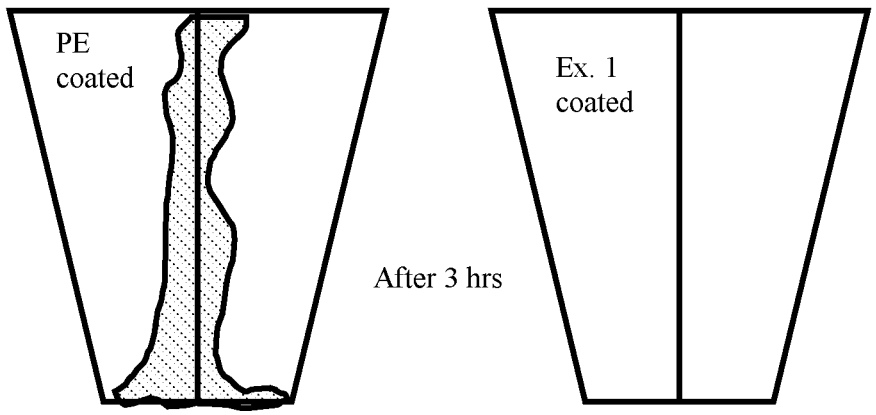
Figure 1(b)  After 3 hrs

HEAT SEALABLE BARRIER COATING

CROSS REFERENCE TO RELATED APPLICATIONS

The present application is a § 371 National Phase application based on PCT/US2018/029528 filed Apr. 26, 2018, which claims the benefit of U.S. Provisional Application Nos. 62/491,301, filed Apr. 28, 2017 and 62/510,315 filed May 24, 2017 the subject matter of each of which is incorporated by reference in their entirety.

FIELD OF THE INVENTION

The present invention is related to coating compositions suitable for coating paper or paperboard substrates. The invention is particularly related to barrier coating compositions that are resistant to water, grease and oil when applied to a substrate.

BACKGROUND OF THE INVENTION

Packaging products and containers based on cellulosic material, such as paper and paperboard, are permeable to oil, grease, water, and other liquids. It is customary to coat or treat paper and paperboard with coatings, such as waxes, polymers, fluorocarbons, and the like. This coating gives barrier properties, essential for packaging food or other products requiring protection. For some applications, it is necessary that the coating is heat-sealable.

The evolution of this type of packaging has been to replace waxes or laminates with polyethylene films coated onto paper and paperboard to ensure the compostability and repulpability of the package. Although waxes and polyethylene films confer excellent barrier properties, they are problematic during the repulping process upon recycling of the paper and paperboard.

Compostability encompasses three factors: biodegradability, disintegration, and ecotoxicity. Biodegradability shows quantitatively the inherent nature of the material to be consumed by microorganisms. Biodegradability protects the environment by preventing the material from accumulating. Disintegration measures whether the material breaks down and falls apart, thereby protecting the compost plant operator. The material may or may not be biodegrading. Ecotoxicity testing determines whether the material shows any inhibition on plant growth, or the survival of soil or aquatic fauna, after composting. Repulpable refers to the test material undergoing the operation of re-wetting and fiberizing for subsequent sheet formation, using a standard process.

The use of volatile organic compounds (VOC) is generally becoming disfavored. The use of VOC-free water-based coatings has become attractive in recent years for use on food or beverage containers. Such containers include paper wraps, plates, bowls, cups, boxes, etc. The coatings can be applied using conventional printing or coating techniques, both online and offline. Printing and coating methods include flexography, rotogravure, blade coating, curtain coating, rod (bar) coating, or other such suitable application means. Therefore, the water-based coatings must have good printability characteristics on press, in addition to durability, quality and productivity.

Currently, industrial heat-sealing of paper packaging coated with a suitable coating, for example a cup wall in a cup-making process, is typically a two-step process. The first step consists of heating both extremities of a blank, and the second step consists of forming the blank into a suitable shape (e.g. a conical cylinder) so as to bring the two heated areas in contact under pressure. In this forming process, the heat-sealable coating layers, usually polyethylene, are brought to a temperature (generally not precisely defined) suitable to soften or partially melt them. When two packaging pieces or extremities of the same piece bearing molten coating are then pressed against one another, the molten material fuses together and a tight bond between the two surfaces is obtained.

CA 3,323,341 discloses latex coatings comprising styrene-butadiene rubber that are used to coat bare paper or paperboard substrates (that is paper or paperboard that does not have a clay coating). The coating of CA 3,323,341 is designed to replace the clay coating that would normally be found on coated paper. The coatings do not contain either clay or wax.

U.S. Pat. No. 6,071,617 discloses a coating that comprises egg white powder, a plasticizer, an emulsifier, and water.

U.S. Pat. No. 6,307,192 describes silicon based coating layers. The coatings are polymeric coatings comprising inorganic chained or crosslinked polymeric backbone which contains alternating silicon and oxygen atoms. The polymeric backbone may also comprise side chains and/or crosslinks formed by organic groups or chains. The coatings do not contain wax.

U.S. Pat. No. 7,019,054 discloses coating formulations that include a fatty acid melamine, a paraffin wax emulsion, and a polyvinyl alcohol. Alternatively, the coating formulations may include a fatty acid melamine wax and a polyvinyl alcohol.

U.S. Pat. No. 7,282,273 discloses a coating composition that comprises a wax and a polyvinyl alcohol. The coatings may further comprise a polyamine.

U.S. Pat. No. 5,763,100 discloses barrier coating compositions comprising an acrylic-styrene copolymer and a wax.

U.S. Pat. No. 7,320,825 discloses an oil and grease resistant multilayer composite comprising a paper or paperboard substrate, coated with a base coat and a topcoat. The base coat comprises a film-forming natural or synthetic polymer. The topcoat comprises a continuous polymer phase having at least one platy mineral pigment and at least one non-platy crystalline mineral pigment dispersed. The coatings do not contain wax.

U.S. Pat. No. 7,427,444 describes a cellulosic product (e.g. paper or paperboard) with a coating that is an emulsion polymerized ethylene-vinyl acetate polymer. The coating does not contain a wax.

U.S. Pat. No. 7,737,200 describes aqueous barrier coating compositions comprising prolamine, a cold water insoluble polymer, water, a water-soluble co-solvent, and a stabilizer. The coatings do not contain wax.

U.S. Pat. No. 8,440,262 discloses water-based wax free coatings.

U.S. Pat. No. 8,734,895 discloses coating compositions comprising a filler, a binder, and calcium carbonate. The coatings are wax free.

U.S. Pat. No. 8,771,812 describes a paper or cardboard packaging with a barrier layer that is prepared by emulsion polymerization of one or more (meth)acrylates, one or more acid monomers, and, optionally acrylonitrile, and one or more further monomers. The barrier layer does not contain wax.

U.S. Pat. No. 8,771,835 discloses biodegradable high barrier packaging comprising a coating having nano pigments and one or more binders, a metallized film layer, and a bonding layer. None of the coatings contain wax.

U.S. Pat. No. 2009/0252980 discloses a grease resistant paper product having a coating comprising an acrylic based polymer and a complementary component such as a polyol or polyoxazoline. The coatings are wax free.

U.S. Pat. No. 2010/0136355 describes water vapor barrier coatings for paper comprising a binder and talcum. Because coatings containing waxes are deemed to be problematic, the coatings are preferably wax free, and if a wax is included, there cannot be more than 5 wt %.

U.S. Pat. No. 2011/0262745 discloses coating compositions comprising a water-based polymer emulsion and pigment. The coatings do not contain wax.

U.S. Pat. No. 2013/0004748 discloses a method for providing a surface of a fiber based substrate with a barrier layer. The barrier layer is formed by depositing nanofibers on the surface by electrospinning or meltspinning.

U.S. Pat. No. 2013/0323368 describes barrier coatings comprising a combination of starch, seaweed extract and paper fibers. The coatings may contain wax, but do not contain acrylic emulsions.

WO 2007/050964 describes a method for imparting grease and/or water resistance to a material by treating with a coating composition. The coating compositions comprises a wax and a polyvinyl alcohol, and optionally a polyamine.

WO 2011/110498 discloses heat sealable coating compositions comprising acrylic imide. The coatings may contain a small amount of wax.

WO 2014/028203 describes radiation curable barrier coating compositions. The radiation curable coating compositions comprise an acrylate monomer, an acrylate oligomer, a micronized wax, and optionally a photoinitiator.

WO 2014/130311 discloses printable radiation curable barrier coating compositions comprising one or more hydrophobic cycloaliphatic monomers, one or more alcohol functional waxes or sterols, and one or more hydrophobic wax materials.

WO 2015/040134 (U.S. Pat. No. 9,840,811) describes a multilayer packaging material comprising a substrate with at least one starch-based barrier layer.

There is still a need for barrier coating compositions that can be used to coat substrates intended for packaging, wherein the coating compositions are resistant to water, oil, grease, and other liquids. In particular, there is a need for heat-sealable coating compositions that will eliminate one or more of the additional materials and/or steps currently required to achieve adequate barrier properties.

SUMMARY OF THE INVENTION

The present invention provides water based coatings for cellulosic substrates, such as paper or paperboard. The coatings are resistant to water, oil, grease, and other liquids. Paper or paperboard substrates coated with the coatings of the present invention can replace paper or paperboard coated by other methods, such as coextrusion with polyethylene (PE), polypropylene (PP), and polylactide/polylactic acid (PLA).

In a particular aspect, the present invention provides a heat sealable water-based coating composition comprising:
 a) 5 wt % to 90 wt % one or more acrylic polymer or copolymer emulsions;
 b) 2 wt % to 25 wt % one or more melting waxes; and
 c) 5 wt % to 85 wt % water;
wherein the heat sealable water-based coating composition is compostable.

In one embodiment, the present invention provides a substrate coated with the coating composition of the invention.

In another embodiment, the present invention provides an article, particularly a packaging article, comprising the substrate coated with the coating composition of the invention.

In a particular aspect, the present invention provides a method of coating a substrate comprising:
 a) providing a substrate having a first surface and a second surface;
 b) providing the heat sealable coating composition of the invention;
 c) applying the heat sealable coating composition to the first surface, or the second surface, or both the first surface and the second surface, of the substrate;
 d) heating the coating at a sufficient temperature to melt the wax in the coating, wherein the melted wax permeates the paper fibers; and
 e) sealing the substrate by applying pressure;
wherein the heat sealable barrier coating is compostable.

In one embodiment, the present invention provides a substrate prepared by the method of coating a substrate with the heat-sealable water-based coating composition of the invention.

BRIEF DESCRIPTION OF THE DRAWINGS

FIG. 1 illustrates the barrier properties of a cup coated with the coating composition of the invention versus a standard cup coated with polyethylene. FIG. 1(a) shows permeation of a dark stain dye after 1 hour of sitting in the cup. FIG. 1(b) shows permeation of a dark stain dye after 3 hours of sifting in the cup.

DETAILED DESCRIPTION OF THE INVENTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

The present invention provides water based coating compositions suitable for coating on cellulosic substrates that will be used for purposes that entail food, cosmetic, etc. contact. An advantage of the coating compositions of the present invention is that substrates coated with the coatings of the invention can be used to replace substrates coated with polymers such as polyethylene, etc.

The coatings of the invention exhibit an improved ecological impact. The coatings are compostable. Substrates and articles prepared with the coatings of the present invention are also compostable. The coatings are particularly suitable for application to cellulosic substrates, such as paper or paperboard. The paper and paperboard articles of the invention are compostable, meaning that they exhibit good biodegradability and disintegration, and do not show ecotoxicity.

The coating compositions of the invention are free of genetically modified organisms (GMO's). That is, the coatings are free of any organism whose genetic material has been altered using genetic engineering techniques.

The coating compositions of the invention are essentially free of volatile organic compounds (VOC's). In certain embodiments, small amounts of VOC may be present in the coating compositions.

The coatings of the present invention exhibit high heat sealability. The coatings also provide better coverage on all surfaces and edges of a substrate to ensure good barrier properties to grease, liquids, and the like.

The coatings of the invention can be printed over with, for example, text and graphics.

The coatings of the invention are suitable to be used to coat substrates that will be in direct food contact. For example, they can be used to coat substrates that will be in direct contact with hot and cold liquids, such as coffee or soda.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, all parts and percentage are by weight (wt % or mass % based on the total weight of the composition), unless specified otherwise.

As used herein, "polymer" and "polymer or copolymer" are used interchangeably, and both terms refer to both polymers and copolymers, unless specified otherwise.

As used herein, the terms "ink and coating compositions," "coating compositions," "inks and coatings," "inks," "coatings," and "composition," "heat-sealable water-based coating composition(s)," "heat-sealable barrier coating," and the like, are used interchangeably, and all refer to the ink and coating compositions of the present invention.

Heat Sealable Barrier Coating Compositions

The coating compositions of the present invention comprise one or more acrylic polymer or copolymer emulsions. The blend of an acrylic polymer emulsion with a melting wax improves the heat-sealability, overprintability, and barrier properties in an eco-friendly coating.

Suitable acrylic polymer or copolymer emulsions include, but are not limited to, pure acrylic polymer, ethylene acrylic acid copolymer, vinyl acrylic acid copolymer, styrene-acrylic copolymer, combinations thereof, and the like. A partial list of acrylic polymer emulsions includes, but is not limited to, Carboset GAW7448; SYNTHRO®-PEL CWO; EUROCRYL 4174XP; EUROCRYL 4184XP; JONCRYL 8052; JONCRYL ECO 2124; JONCRYL 8050; Carboset® GA-7428; Carboset® GA-7424; Induprint SE 245; Induprint SE 375; NEOCRYL A2092; NEOCRYL A2099; Induprint SE 288; Texicryl 13813.

In a preferred embodiment, the acrylic polymer emulsion would be present in an amount of equal to or greater than 20 wt %, based on the total weight of the coating composition. Preferably, the acrylic polymer emulsion would be present in an amount of equal to or greater than 30 wt %, more preferably equal to or greater than 40 wt %, more preferably equal to or greater than 50 wt %, or most preferably equal to or greater than or equal to 60 wt %. The amount of acrylic polymer emulsion present in the coating compositions of the present invention is typically about 5 wt % to about 90 wt %, based on the total weight of the coating composition. For example, the acrylic emulsion may be present in an amount of about 5 wt % to about 80 wt %; or about 5 wt % to about 75 wt %; or about 5 wt % to about 70 wt %; or about 5 wt % to about 65 wt %; or about 5 wt % to about 60 wt %; or about 5 wt % to about 55 wt %; or about 5 wt % to about 50 wt %; or about 5 wt % to about 45 wt %; or about 5 wt % to about 40 wt %; or about 5 wt % to about 35 wt %; or about 5 wt % to about 30 wt %; or about 5 wt % to about 25 wt %; or about 5 wt % to about 20 wt %; or about 5 wt % to about 15 wt %; or about 5 wt % to about 10 wt %; or about 10 wt % to about 10 wt % to about 90 wt %; or about 10 wt % to about 80 wt %; or about 10 wt % to about 70 wt %; or about 10 wt % to about 60 wt %; or about 10 wt % to about 50 wt %; or about 10 wt % to about 40 wt %; or about 10 wt % to about 30 wt %; or about 10 wt % to about 20 wt %; or about 20 wt % to about 90 wt %; or about 20 wt % to about 80 wt %; or about 20 wt % to about 70 wt %; or about 20 wt % to about 60 wt %; or about 20 wt % to about 50 wt %; or about 20 wt % to about 40 wt %; or about 20 wt % to about 30 wt %; or about 30 wt % to about 90 wt %; or about 30 wt % to about 80 wt %; or about 30 wt % to about 70 wt %; or about 30 wt % to about 60 wt %; or about 30 wt % to about 50 wt %; or about 30 wt % to about 40 wt %; or about 40 wt % to about 90 wt %; or about 40 wt % to about 80 wt %; or about 40 wt % to about 70 wt %; or about 40 wt % to about 60 wt %; or about 40 wt % to about 50 wt %; or about 50 wt % to about 90 wt %; or about 50 wt % to about 80 wt %; or about 50 wt % to about 70 wt %; or about 50 wt % to about 60 wt %; or about 60 wt % to about 90 wt %; or about 60 wt % to about 80 wt %; or about 60 wt % to about 70 wt %; or about 70 wt % to about 90 wt %; or about 70 wt % to about 80 wt %; or about 80 wt % to about 90 wt %.

The coating compositions of the present invention comprise one or more melting waxes. Upon heat sealing, the melted wax permeates the paper fibers to protect all of the surfaces and edges of the substrate (typically a paper or paperboard substrate). Suitable melting waxes include, but are not limited to, paraffin wax, acrylic-grafted paraffin wax, crystalline wax, polyethylene wax, high density polyethylene wax, polyethylene/polytetrafluoroethylene wax, carnauba wax, combinations thereof, and the like. The wax is added in a sufficient amount so that, during the heating step, it melts, amidst the softening resin. Though not bound by any particular theory, it is believed that, provided that the temperature is high enough, preferably between 100° C. to 220° C., and dwell time is sufficient, preferably between 0.5 to 5 seconds between heating and sealing, the wax actually seeps out of the coating to form a liquid layer at the surface. When this liquid surface is further pressed against uncoated board, the liquid wax is believed to easily penetrate the exposed board fibers (wicking), leading to effective protection of the substrate against grease and water, while pressure ensures that the resin portion also effectively penetrates the fibers to yield a fiber-tear bond upon cooling. Fiber-tear bond is when the substrate will tear before the coating loses adhesion to the substrate. Fiber-tear bond indicates that the water-based coatings of the present invention will maintain their adhesion up until the point where the substrate tears. Thus, the coating has a stronger bond to the substrate than the strength of the substrate itself. If sealing is performed at or very near the edge of the coated blank, as is the case for paper cups, effective protection of the edge by this wax wicking mechanism is achieved. It is well documented that polyethylene achieves no such edge protection, and thus containers prepared with a polyethylene coating are vulnerable to leaking. FIG. 1 illustrates this. The coating compositions of the present invention provide not only edge sealing and protection, but provide resistance to water, grease and oils throughout the surface of the substrate. Paper and paperboard coated on one or both sides with a coating composition of the invention can easily and cost-effectively be used to design packaging for moist and/or greasy foods, having an exposed inner seam. Examples of packaging with a coating composition applied to one side are the equivalent of single-poly paper cups or food trays, with added benefit of edge protection built in-situ at the sealing time.

Typically, the melting wax has a melting point of about 40° C. to about 100° C. Preferably, the wax has a melting point of about 50° C. to about 90° C. For example, the wax may have a melting point of about 40° C. to about 80° C.; or about 40° C. to about 70° C.; or about 40° C. to about 60° C.; or about 40° C. to about 50° C.; or about 50° C. to about 100° C.; or about 50° C. to about 90° C.; or about 50° C. to about 80° C.; or about 50° C. to about 70° C.; or about 50° C. to about 60° C.; or about 60° C. to about 100° C.; or about 60° C. to about 90° C.; or about 60° C. to about 80° C.; or about 60° C. to about 70° C.; or about 70° C. to about 100° C.; or about 70° C. to about 90° C.; or about 70° C. to about 80° C.; or about 80° C. to about 100° C.; or about 80° C. to about 90° C.; or about 90° C. to about 100° C.

The melting wax is typically present in the coating compositions of the present invention in an amount of about 2 wt % to about 25 wt %, based on the total weight of the ink or coating composition. For example, the melting wax may be present in an amount of about 2 wt % to about 20 wt %; or about 2 wt % to about 15 wt %; or about 2 wt % to about 10 wt %; or about 2 wt % to about 5 wt %; or about 5 wt % to about 25 wt %; or about 5 wt % to about 20 wt %; or about 5 wt % to about 15 wt %, or about 5 wt % to about 10 wt %; or about 10 wt % to about 25 wt %; or about 10 wt % to about 20 wt %; or about 10 wt % to about 15 wt %; or about 15 wt % to about 25 wt %; or about 15 wt % to about 20 wt %; or about 20 wt % to about 25 wt %.

The inks and coating compositions of the invention are water-based, and contain water. In a preferred embodiment, the ink and coating compositions of the present invention comprise equal to or greater than about 5 wt % water, based on the total weight of the composition. Preferably, the water is present in an amount of equal to or greater than about 10 w %; or equal to or greater than about 15 wt %, or equal to or greater than about 20 wt %. Typically, the water is present in the coating composition in an amount of about 5 wt % to about 85 wt %, based on the total weight of the composition. For example, water may be present in an amount of about 5 wt % to about 80 wt %; or about 5 wt % to about 70 wt %; or about 5 wt % to about 60 wt %; or about 5 wt % to about 50 wt %; or about 5 wt % to about 40 wt %; or about 5 wt % to about 30 wt %; or about 5 wt % to about 20 wt %; or about 5 wt % to about 15 wt %; or about 5 wt % to about 10 wt %; or about 10 wt % to about 85 wt %; or about 10 wt % to about 80 wt %; or about 10 wt % to about 70 wt %; or about 10 wt % to about 60 wt %; or about 10 wt % to about 50 wt %; or about 10 wt % to about 40 wt %; or about 10 wt % to about 30 wt %; or about 10 wt % to about 20 wt %; or about 20 wt % to about 85 wt %; or about 20 wt % to about 80 wt %; or about 20 wt % to about 70 wt %; or about 20 wt % to about 60 wt %; or about 20 wt % to about 50 wt %; or about 20 wt % to about 40 wt %; or about 20 wt % to about 30 wt %; or about 30 wt % to about 85 wt %; or about 30 wt % to about 80 wt %; or about 30 wt % to about 70 wt %; or about 30 wt % to about 60 wt %; or about 30 wt % to about 50 wt %; or about 30 wt % to about 40 wt %; or about 40 wt % to about 85 wt %; or about 40 wt % to about 80 wt %; or about 40 wt % to about 70 wt %; or about 40 wt % to about 60 wt %; or about 40 wt % to about 50 wt %; or about 50 wt % to about 85 wt %; or about 50 wt % to about 80 wt %; or about 50 wt % to about 70 wt %; or about 50 wt % to about 60 wt %; or about 60 wt % to about 85 wt %; or about 60 wt % to about 80 wt %; or about 60 wt % to about 70 wt %; or about 70 wt % to about 85 wt %; or about 70 wt % to about 80 wt %; or about 80 wt % to about 85 wt %. In particular embodiments, the inks and coating compositions of the present invention would comprise about 10 wt % to about 70 wt % water, more preferably about 20 wt % to about 60 wt %.

The ink and coating compositions of the present invention optionally may further comprise one or more additives that are typically used in ink and coating compositions. Examples of such additives include, but are not limited to, adhesion promoters, light stabilizers, de-gassing additives, flow promoters, defoamers, antioxidants, stabilizers, wetting agents, surfactants, clays, fillers, dispersants, plasticizers, rheological additives, other waxes, silicones, colorants, and combinations thereof. When present, each additive is typically present in an amount of about 0.01 wt % to about 20 wt %, based on the total weight of the composition. For example, additives may be present in an amount of about 0.01 wt % to about 10 wt %; or about 0.01 wt % to about 5 wt %; or about 0.01 wt % to about 1 wt %; or about 0.1 wt % to about 20 wt %; or about 0.1 wt % to about 10 wt %; or about 0.1 wt % to about 5 wt %; or about 0.1 wt % to about 1 wt %; or about 1 wt % to about 20 wt %; or about 1 wt % to about 10 wt %; or about 1 wt % to about 5 wt %; or about 5 wt % to about 20 wt %; or about 5 wt % to about 10 wt %; or about 10 wt % to about 20 wt %.

Colorants may also be incorporated into the coating compositions. Suitable colorants include, but are not limited to organic or inorganic pigments and dyes. The dyes include but are not limited to, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

The coating compositions of the present invention are preferably free of VOC's. However, small amounts of solvents (preferably alcohols) may be used. When present, the solvents are preferably present in an amount of less than 10 wt %, based on the total weight of the composition. More preferably, the solvents are present in an amount of less than 5 wt %, or less than 2 wt %.

The compositions of the invention also preferably impart good overprintability. This allows for the printing of text or graphics on the coated substrate.

The coatings of the present invention provide for improvements in paper and paperboard packaging that would allow a conversion from plastic packaging to paper packaging, thus utilizing a more environmentally friendly material, which can be more readily recycled. In addition, the compositions of the present invention allow for the replacement of paper substrates that are extrusion coated with, for example, PE, PP, PLA, and the like.

The coating compositions of the present invention can be applied to the substrate by any suitable means. Suitable application methods include, but are not limited to, gravure printing, flexographic coating, curtain coating, flood coating, or Meyer bar application. The coating compositions are typically applied in a sufficient amount to give a coating of 2 to 15 g/m$^2$ dry weight. For example, the coating may be applied in an amount of 4 to 15 g/m$^2$ dry weight; or 2 to 12 g/m$^2$ dry weight.

The coating compositions of the present invention may be coated on one side of a paper or paperboard substrate (single-sided), or on both sides of a paper or paperboard substrate (double-sided). Preferably, the coating compositions of the present invention are applied to at least the side that will form the inside of the container or packaging, and thus be in contact with the contents thereof. One or more coating layers may be applied to either or both sides of the substrate, in any configuration. The coating compositions of the present invention applied to each side of the substrate may be the same formulation, or different formulations. The coating compositions of the present invention can be applied to each side of the substrate at the same, or different, film weights, depending on the intended use. In certain embodiments, the coating applied to the surface of the substrate that will eventually become the interior surface of a container would be more robust in terms of product resistance, as it will be in direct contact with materials within the container, while the coating used on the surface of the substrate that will become the exterior surface of the container need only have resistance to water formed by condensation.

In order for the coatings of the present invention to work for a wide variety of circumstances (single-sided or double-sided coating, slow and fast forming lines, different sealing temperatures, etc.) it may be required that different variations of the coating compositions be used on each side of the substrate; or layers with variable thickness; or that one of the substrate sides be coated before the other (pre-printing or post-printing); or that each side of the substrate be coated with a different process than the other (e.g. one with two hits of gravure, the other with flexo, etc.). In any case, no additional material or process step is required to achieve the edge protection effect (against grease, oil, and water, etc.) at forming time, as this is obtained in-situ through the melting wax. Examples of additional materials or process steps that use of the coating compositions of the present invention can eliminate are usage of a seal promoter; caulking; wax spraying; apposition of a protective strip; spraying or post-coating the edge of the wall prior to cup forming; burying the edge of the inner lap of cup walls into a layer of adhesive pre-coated on the outer lap of the wall, etc. In all of these examples, barrier properties are obtained through the use of an additional material and/or process step to achieve the goal, which invariably leads to additional modes of failure, longer processing times, increased complexity, and ulti- mately higher costs. These disadvantages are eliminated by using the coating compositions of the present invention.

EXAMPLES

The following examples illustrate specific aspects of the present invention, and are not intended to limit the scope thereof in any respect and should not be so construed.

Examples 1 to 5. Heat-Sealable Water-Based Coating Compositions

Heat-sealable water-based coating compositions were prepared. The formulations are shown in Tables 1 to 5.

TABLE 1

| Example 1 | |
|---|---|
| Material | wt % |
| Carboset 7424 | 78.9 |
| Microcarb MC5 | 5.0 |
| BYK 1740 | 0.1 |
| Aquabead 325 E | 16.0 |
| Total | 100.00 |

TABLE 2

| Example 2 | |
|---|---|
| Material | wt % |
| Induprint SE 288 | 80.5 |
| Omayacarb 2T | 6.0 |
| Xiameter AFE 1510 | 0.5 |
| LUBA-print 445W | 13.0 |
| Total | 100.00 |

TABLE 3

| Example 3 | |
|---|---|
| Material | wt % |
| Texicryl 13813 | 77.6 |
| Umbria Filler GS 1 D | 7.0 |
| Dowsil 8590 | 0.4 |
| Ultralube E340 FM | 15.0 |
| Total | 100.00 |

TABLE 4

| Example 4 | |
|---|---|
| Material | wt % |
| EOC 4174 XP | 78.6 |
| Omayacoat 8500G | 3.0 |
| Tego Foamex 1488 | 0.4 |
| Ultralube E235 | 18.0 |
| Total | 100.00 |

TABLE 5

Example 5

| Material | wt % |
|---|---|
| Carboset GAW 7448 | 80.8 |
| Hydrocarb OG EN SAC | 4.0 |
| Tego Foamex 800 | 0.2 |
| Synthro PEL WA 491 | 15.0 |
| Total | 100.00 |

Example 6. One Sided Coating onto Paperboard Substrate

The coating compositions were applied to one side (interior side) of a paperboard substrate at a coating weight of 12 g/m² dry weight. The substrate was formed into a cup.

The printed paperboard was positioned about 2 inches from a 600° C. heat source for about 1-2 seconds. The paperboard was formed into a cup using techniques known in the art.

The performance of the cup coated with a coating composition of the present invention was compared to a standard paper cup coated with polyethylene (Comparative). A colored liquid (dark staining ink) was placed in each cup, and left standing for a period of time. Wicking of the liquid through the edge and into the substrate, and ultimately into the exterior of the cup, was shown as a dark stain on the outside of the cup. As shown in FIG. 1(a) (after 1 hour) and FIG. 1(b) (after 3 hours), significantly more of the liquid seeped through the seam of the comparative cup. The cup coated with the coating composition of the present invention showed no such wicking or seepage at either 1 hour or 3 hours. That is, the cup coated with a coating composition of the invention was much more resistant to the permeation of liquids through the seam of the cup.

Example 7. Two Sided Application of the Coating Composition of the Invention

The coating compositions were used to make a cup with both the interior and the exterior of the cup having the coating composition of the invention. The coating composition was applied to the interior surface of a clay-coated paperboard substrate at a film weight of 12 g/m² dry weight. The printed paperboard was positioned about 2 inches from a 600° C. heat source for about 1 to 2 seconds. In a subsequent coating operation, the coating composition was applied to the exterior surface of the substrate at a film weight of about 4 g/m² dry weight. The coated cup of Example 7 sealed at the high speed and lower temperature characteristic of high-volume packaging lines. Initial edge protection results were similar to Example 6.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A heat sealable water-based coating composition comprising:
   a) 5 wt % to 90 wt % one or more acrylic polymer or copolymer emulsions;
   b) 2 wt % to 25 wt % one or more melting waxes;
   c) 5 wt % to 85 wt % water; and
   d) 0.01 wt % to 20 wt % one or more fillers;
   wherein the heat sealable water-based coating composition is a single composition comprising all of items a, b, c, and d; and
   wherein the heat sealable water-based coating composition is compostable.

2. The composition of claim 1, wherein the melting wax has a melting point of 40° C. to 100° C.

3. The composition of claim 1, wherein the one or more melting waxes are selected from the group consisting of paraffin wax, acrylic-grafted paraffin wax, crystalline wax, polyethylene wax, high density polyethylene wax, polyethylene/polytetrafluorethylene wax, carnauba wax, and combinations thereof; and/or wherein the one or more acrylic polymer or copolymer emulsions are selected from the group consisting of pure acrylic polymer, ethylene acrylic acid copolymer, vinyl acrylic acid copolymer, styrene-acrylic copolymer, and combinations thereof.

4. The composition of claim 1, further comprising one or more additives selected from the group consisting of adhesion promoters, light stabilizers, de-gassing additives, flow promoters, defoamers, antioxidants, stabilizers, wetting agents, surfactants, clays, dispersants, plasticizers, rheological additives, other waxes, silicones, colorants, and combinations thereof.

5. The composition of claim 1, wherein the coating composition is a barrier coating composition, resistant to permeation of liquids and vapors.

6. The composition of claim 1, wherein the composition is recyclable, biodegradable, and compostable.

7. A substrate comprising the coating composition of claim 1.

8. The substrate of claim 7, which is cellulosic.

9. The substrate of claim 7, wherein the substrate is compostable; and/or wherein the substrate is repulpable.

10. An article comprising the substrate of claim 7.

* * * * *